United States Patent

Curry et al.

[11] Patent Number: 5,589,870
[45] Date of Patent: Dec. 31, 1996

[54] SPOT PROFILE CONTROL USING FRACTIONAL INTERLACE FACTORS IN A POLYGON ROS

[75] Inventors: Douglas N. Curry, Menlo Park; David L. Hecht, Palo Alto, both of Calif.

[73] Assignee: Xerox Corporation, Stamford, Conn.

[21] Appl. No.: 332,175

[22] Filed: Oct. 31, 1994

[51] Int. Cl.[6] .................. B41J 2/45; B41J 2/455; B41J 2/47
[52] U.S. Cl. .......................... 347/233; 347/241
[58] Field of Search ................... 347/243, 261, 347/233, 235, 240, 234

[56] References Cited

U.S. PATENT DOCUMENTS

| | | | |
|---|---|---|---|
| 4,873,537 | 10/1989 | Ohta | 347/252 |
| 5,119,113 | 6/1992 | Prakash et al. | 347/241 |
| 5,233,367 | 8/1993 | Curry . | |
| 5,471,236 | 11/1995 | Ito | 347/233 |

Primary Examiner—Benjamin R. Fuller
Assistant Examiner—Thinh Nguyen
Attorney, Agent, or Firm—Oliff & Berridge

[57] ABSTRACT

An image forming apparatus and method use interlace scanning of plural light beams by deflecting the plural beams with a rotating polygon onto a recording medium. Corrections are made to the scan envelope to compensate for errors due to perceived imperfections in the spot profile or aberrations in the optical and mechanical systems used to scan the spot. The corrections are performed by adjusting intensity of gaussian components of the envelope according to a look up table.

28 Claims, 12 Drawing Sheets

| n | n·q | $e_n =$ mod I(nq) |
|---|---|---|
| 0 | 0 | 0 |
| 1 | 4 | 0.5 |
| 2 | 8 | 1.0 |
| 3 | 12 | 1.5 |

| SCAN FIELD POSITION n | LASER POWER (0 = OFF, 1 = FULL ON) | | | |
|---|---|---|---|---|
| | LaserA(n) | LaserB(n) | LaserC(n) | LaserD(n) |
| -10 | 0.35 | 0.85 | 0.65 | 0.15 |
| -9 | 0.331 | 0.831 | 0.669 | 0.169 |
| -8 | 0.314 | 0.814 | 0.686 | 0.186 |
| -7 | 0.299 | 0.799 | 0.701 | 0.201 |
| -6 | 0.286 | 0.786 | 0.714 | 0.214 |
| -5 | 0.275 | 0.775 | 0.725 | 0.225 |
| -4 | 0.266 | 0.766 | 0.734 | 0.234 |
| -3 | 0.259 | 0.759 | 0.741 | 0.241 |
| -2 | 0.254 | 0.754 | 0.746 | 0.246 |
| -1 | 0.251 | 0.751 | 0.749 | 0.249 |
| 0 | 0.25 | 0.75 | 0.75 | 0.25 |
| 1 | 0.251 | 0.751 | 0.749 | 0.249 |
| 2 | 0.254 | 0.754 | 0.746 | 0.246 |
| 3 | 0.259 | 0.759 | 0.741 | 0.241 |
| 4 | 0.266 | 0.766 | 0.734 | 0.234 |
| 5 | 0.275 | 0.775 | 0.725 | 0.225 |
| 6 | 0.286 | 0.786 | 0.714 | 0.214 |
| 7 | 0.299 | 0.799 | 0.701 | 0.201 |
| 8 | 0.314 | 0.814 | 0.686 | 0.186 |
| 9 | 0.331 | 0.831 | 0.669 | 0.169 |
| 10 | 0.35 | 0.85 | 0.65 | 0.15 |

FIG. 13

SPOT PROFILE CONTROL USING FRACTIONAL INTERLACE FACTORS IN A POLYGON ROS

BACKGROUND OF THE INVENTION

1. Field of the Invention

This invention relates to a method and apparatus for correcting perceived imperfections and aberrations in the optical and mechanical systems of a scanning laser system. In particular, the present invention adjusts the profile of a laser spot in a scanning laser system.

2. Description of Related Art

U.S. Pat. No. 5,233,367 to Curry, discloses a multi-beam interlaced scanning system and its disclosure is herein incorporated by reference.

In such scanning laser systems, it is sometimes necessary or desired to correct for perceived imperfections in the spot profile or to correct for aberrations in the optical and mechanical systems used to scan the spot. U.S. Pat. No. 5,233,367 suggests that a uniform scan may be obtained by varying the spot size. Typically, it is difficult and expensive to design an optical source or system which can generate several beams which are adjustable in intensity and spaced so as to overlap. A multibeam laser diode has the desired adjustability, but the spacing is such that the imaged sources do not produce overlapping spots. An optical system which alters the trajectory of the beams so that they overlap would be expensive as it would be utilizing separate sources, either gas or diode, and optically combining them so that they overlap. Slanting sources in a multibeam ROS would sere to simulate the overlapping of spots in the process direction, but would introduce a start of scan jitter error as well as slanting individual spots aspect ratio. U.S. Pat. No. 5,233,367 does not disclose a method for performing correction to imperfection in spot profile and system caused aberrations.

SUMMARY OF THE INVENTION

It is therefore an object of the present invention to provide a fractional interlaced scanning apparatus and method for correcting perceived imperfections in spot profile and aberrations in the optical and mechanical systems used to scan the spot.

In order to realize this and other objects of the present invention, an apparatus and method are provided for determining a shape of an envelope representative of the plurality of light beams to be separately scanned to form the scan line, adjusting the shape of the envelope by changing one of the plurality of light beams, and separately scanning the plurality of light beams corresponding to the adjusted shape of the envelope to form the scan line.

BRIEF DESCRIPTION OF THE DRAWINGS

Further advantages and features of the invention will become apparent when the following detailed description is read in conjunction with the attached drawings in which:

FIG. 13 is an example of a look up table.

DETAILED DESCRIPTION OF PREFERRED EMBODIMENTS

The invention will be discussed with general reference to the teachings and equations, as cited above, from U.S. Pat. No. 5,233,367.

Figure 1:
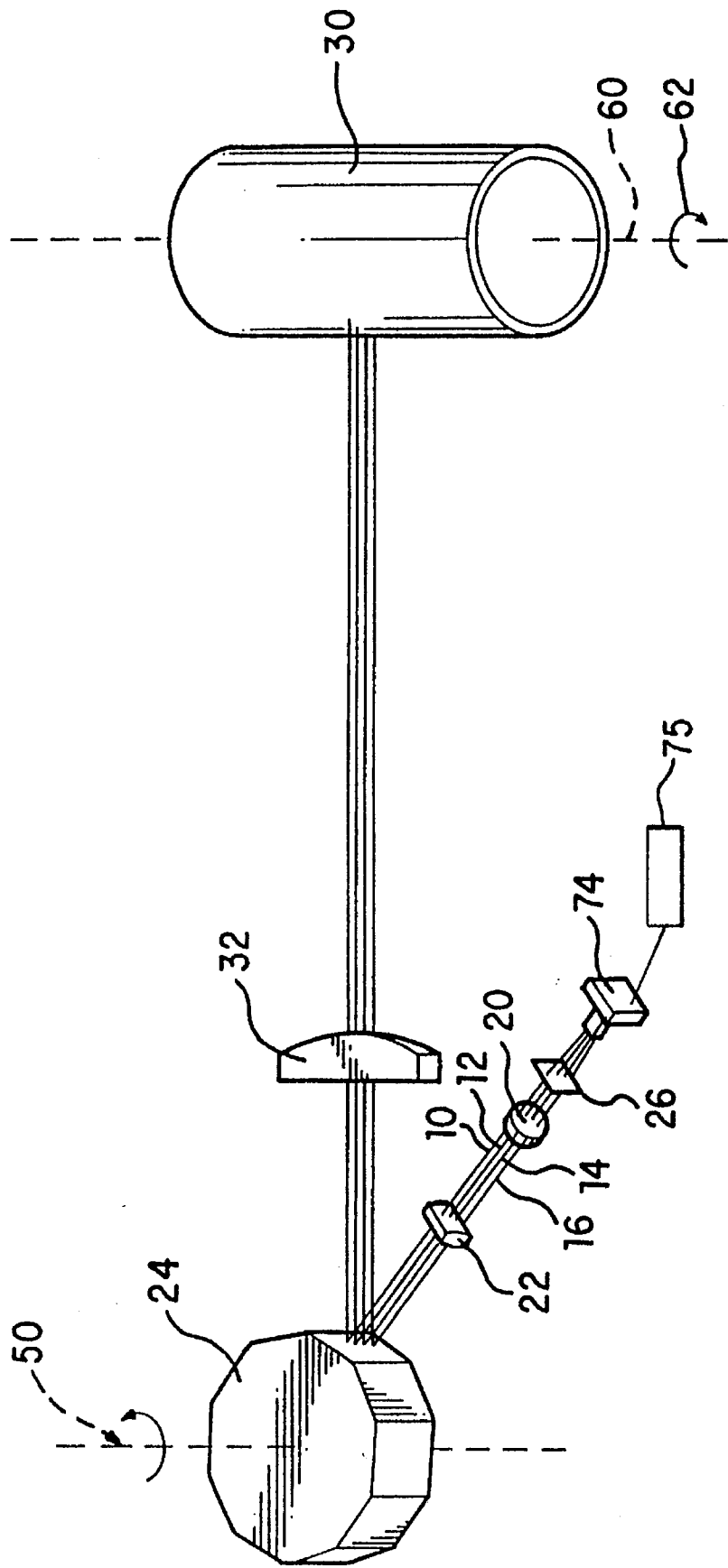
FIG. 1 is a block diagram of a printer having a multiple beam scanner in which the present invention may be employed.

FIG. 1 illustrates a conventional multibeam printer having a reflective, multifaceted polygon 24 which is rotated about its central axis 50, to repeatedly scan multiple light beams 10, 12, 14 and 16 in a line scanning direction across a photosensitive recording medium 30. While being scanned by the light beams, the recording medium 30 is advanced (by means not shown) in an orthogonal direction denoted by the arrow 62 so that the light beams 10, 12, 14 and 16 expose it in accordance with a raster scanning pattern representing the image to be printed.

As a general rule, the light beams 10, 12, 14 and 16 are supplied by laser diodes housed in a beam generating diode array 74 and are intensity modulated in accordance with data samples representing the image to be printed. The beams 10, 12, 14 and 16 generated by the laser diode array 74 pass through an aperture 26 that truncates the beams to their mutually overlapping widths. The beams 10, 12, 14 and 16 then pass through a collimator 20 and a cylinder lens 22 that focuses the beams 10, 12, 14 and 16 on the polygon 24. The beams 10, 12, 14 and 16 are then deflected onto an optical path toward the photosensitive recording medium 30 by the rotating polygon 24. The beams 10, 12, 14 and 16 then pass through a corrective optical system 32 which compensates for various beam errors. A controller 75 can alter the number of beams generated, the spacing between the beams, the angular velocity of the polygon 24 or the velocity of the photoreceptive recording medium 30.

As the photoreceptor moves and the polygon rotates through a single facet, the beams will lay down multiple scans. Successive facets will position scans between or on top of those already laid down until the beams have passed due to the motion of the photoreceptor.

Scans produced on the recording medium by adjacent light beam sources, laid down by separate facets, are separated vertically by beam spacing B, and the beam spacing for a multibeam system must be uniform. The distance between adjacent scans laid down by a single facet of the polygon, measured in scans, is the interlace factor I and must be a number greater than 0. The system of laying down scan lines positioned or interlaced between other scan lines is known as interlaced scanning and may be defined according to the relationship among these variables:

$$\frac{I}{Q} = \frac{Bwf}{V_o} \quad (1)$$

where $V_o$ is the exposure medium velocity, w is the polygon angular velocity, f is the number of facets per revolution of the polygon, Q is the number of equally spaced beams, B is the beam spacing, and I is the interlace factor.

Generally, for interlace scanning, any positive value for the interlace factor I may be selected. By selecting various values for the interlace factor I and the number of beams Q, it is possible to obtain equally spaced interlace scanning.

For equally spaced, non-overlapped interlace scanning, any positive integer for I may selected so long as I and Q do not have any common integer divisors greater than 1. For equally spaced, non-overlapped, interlace scanning, the interlace factor I is the distance between adjacent scans laid down by a single facet of the polygon divided by the distance between adjacent, interlaced scans. An example of this can be seen in FIG. 2, which is a diagram showing the scans laid down by a four beam system where the interlace factor I is 3. The circles, A, B, C and D represent scans laid down by adjacent sources by a single facet of the polygon. Between any two adjacent scans laid down by a single facet of the polygon are interlaced additional scans laid down by prior or subsequent facets of the polygon. In this way, uniform, non-overlapped scanning will occur.

Figure 7:
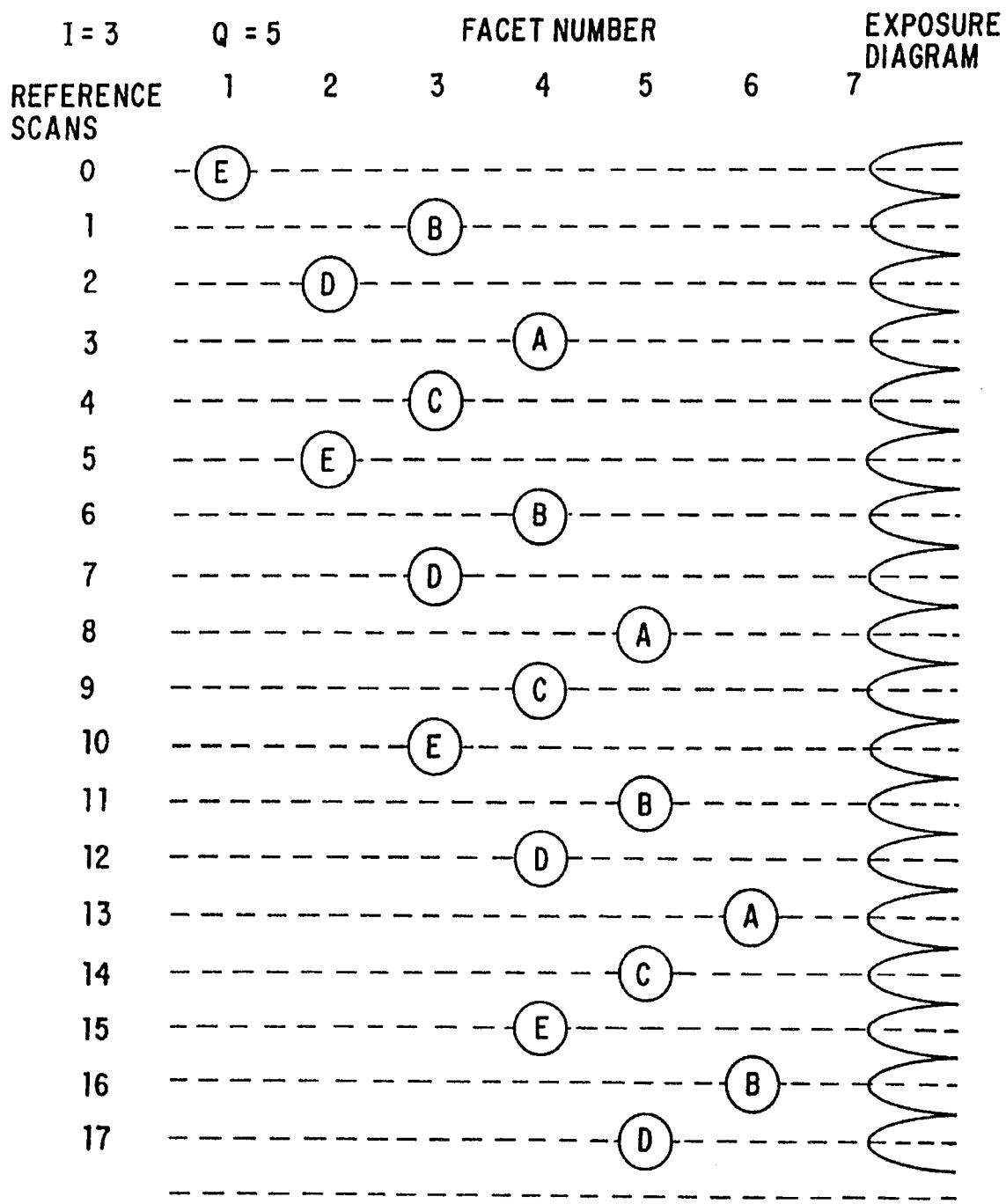
FIG. 7 is a diagram showing scan spacing where I=3 and Q=5.
Figure 8:
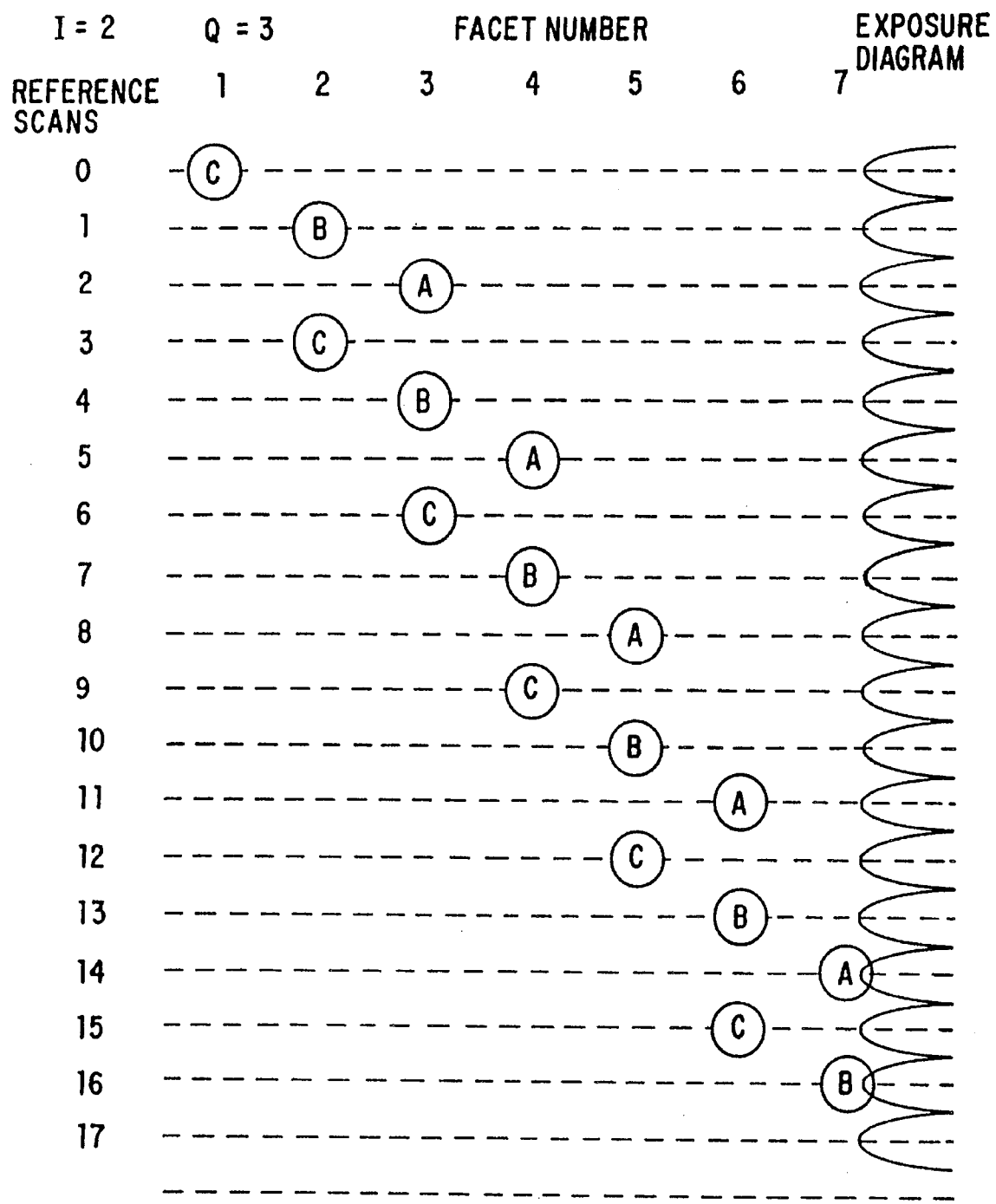
FIG. 8 is a diagram showing scan spacing where I=2 and Q=3.

A reference scan is the number of scans the media moves during a single facet of the polygon, and it is equal to the number of beams being used. For example, when there are four sources, Q=4, the media moves four reference scans during a facet time regardless of the velocity of the media or the polygon. This can also be thought of as the average scan rate since, if four beams per facet are laid down, then, at any stationary point, the laser scanner will traverse four scans per facet in the process direction on average, regardless of the speed at which scanning is occurring or how fast the media is moving. FIGS. 2 through 6 illustrate this concept showing that any laser diode spot represented by A, B, C or D moves four reference scans per facet since, in these examples, Q=4. In FIG. 7, the number of sources, Q, is five, and the number of reference scans moved per facet is shown as five. In FIG. 8, the number of sources, Q, is three, and the number of reference scan move per facet is shown as three.

Figure 2:
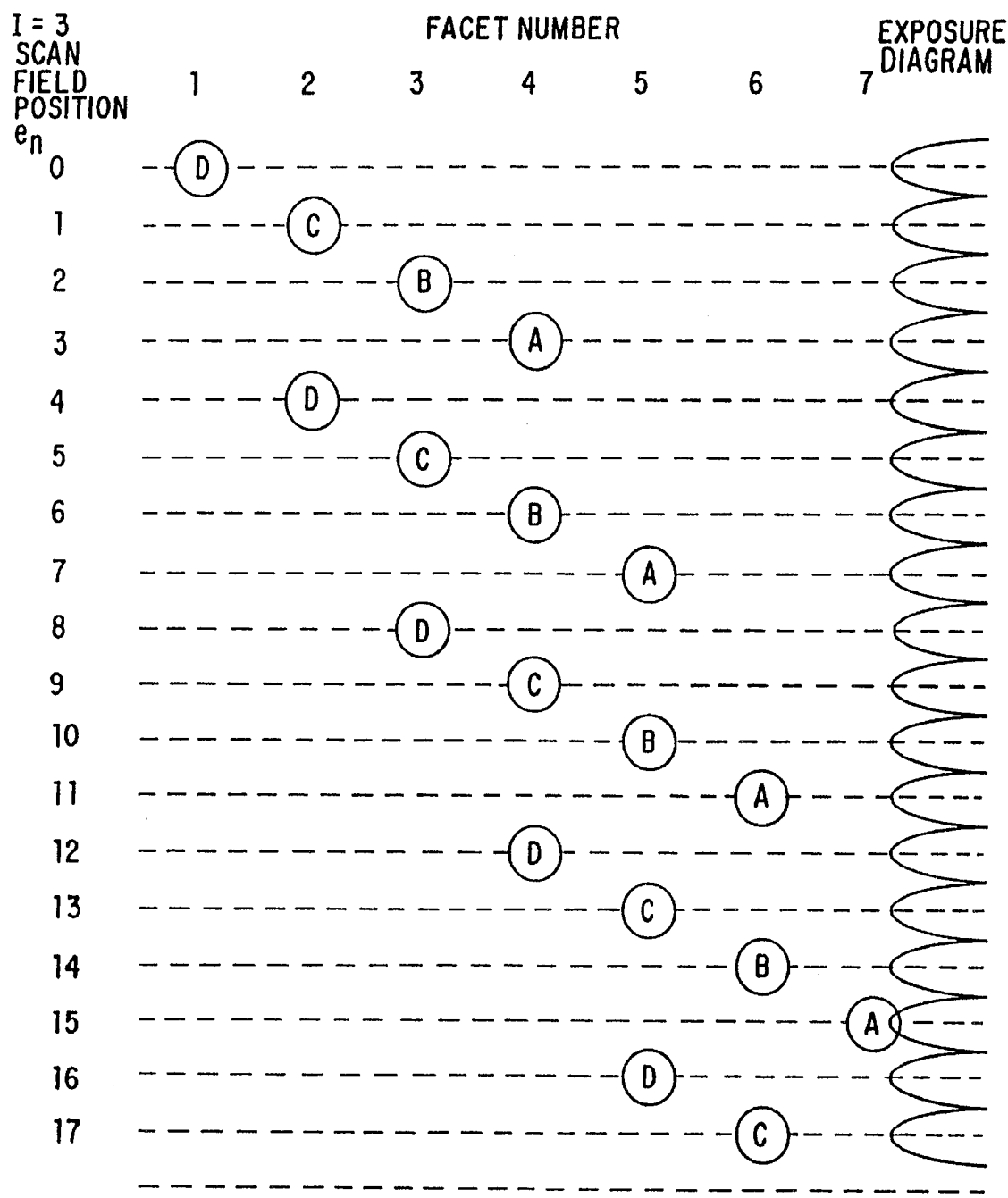
FIG. 2 is a diagram showing scan spacing where I=3 and Q=4.

In FIG. 2, the interlace factor is the number of reference scans separating two adjacent beams on a single facet at the photoreceptor, in this example, the interlace factor is three. This number is affected by media velocity or polygon rotational rate, as shown in equation 2.

Figure 3:
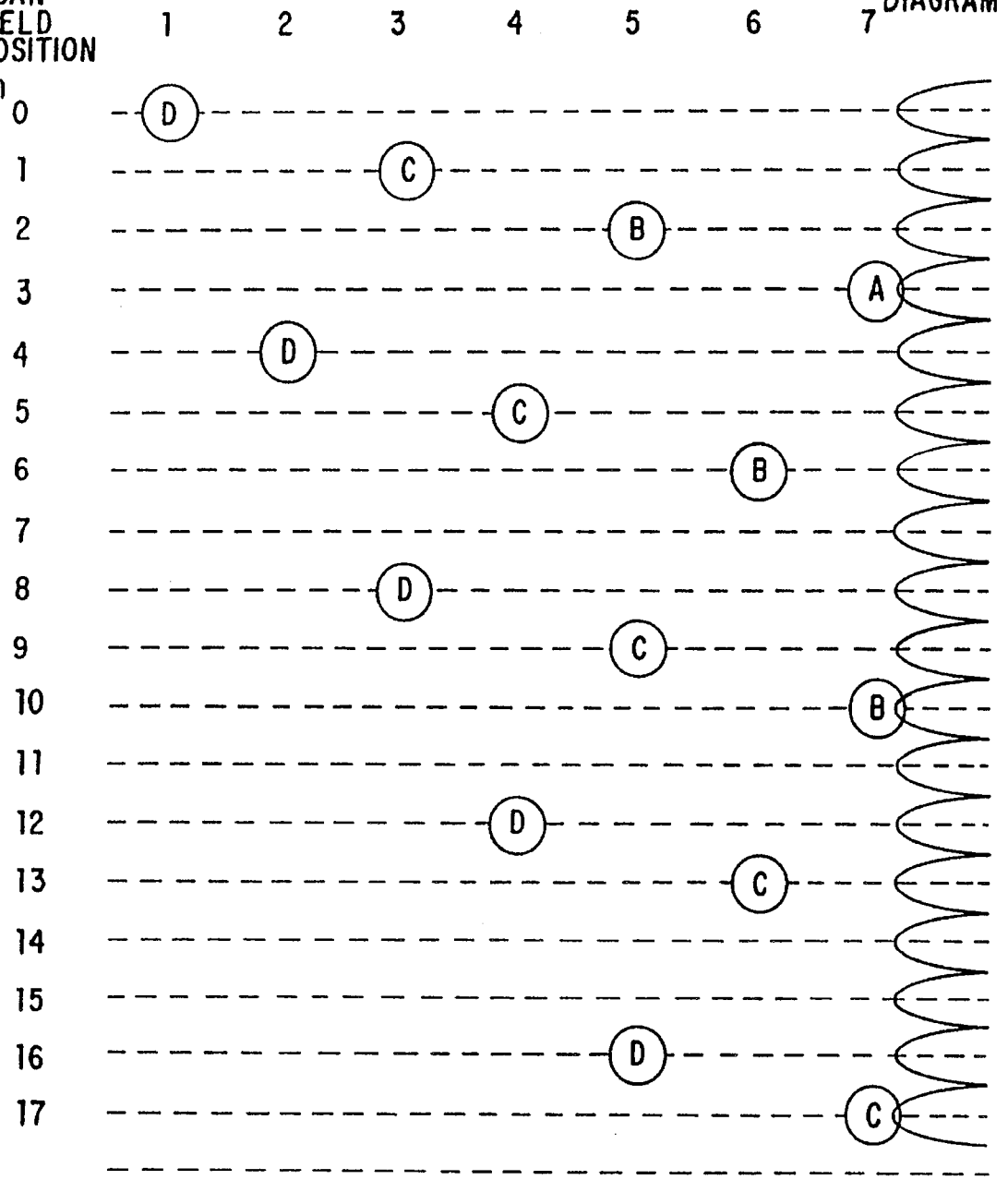
FIG. 3 is a diagram showing scan spacing where I=7 and Q=4.

FIG. 3 illustrates the situation where the interlace factor I is 7 and the number of sources Q is 4. Because I and Q have no common divisors greater than 1 and I is a positive integer, non-overlapped, interlaced scanning will occur. Adjacent scans laid down during a single facet of the polygon are separated by a distance of 7 as measured in reference scans. For example, during facet 3 circles C and D are separated by a distance of 7 reference scans. This situation is obtained by adjusting variables B, $V_o$, f and ω in equation 2.

Figure 4:
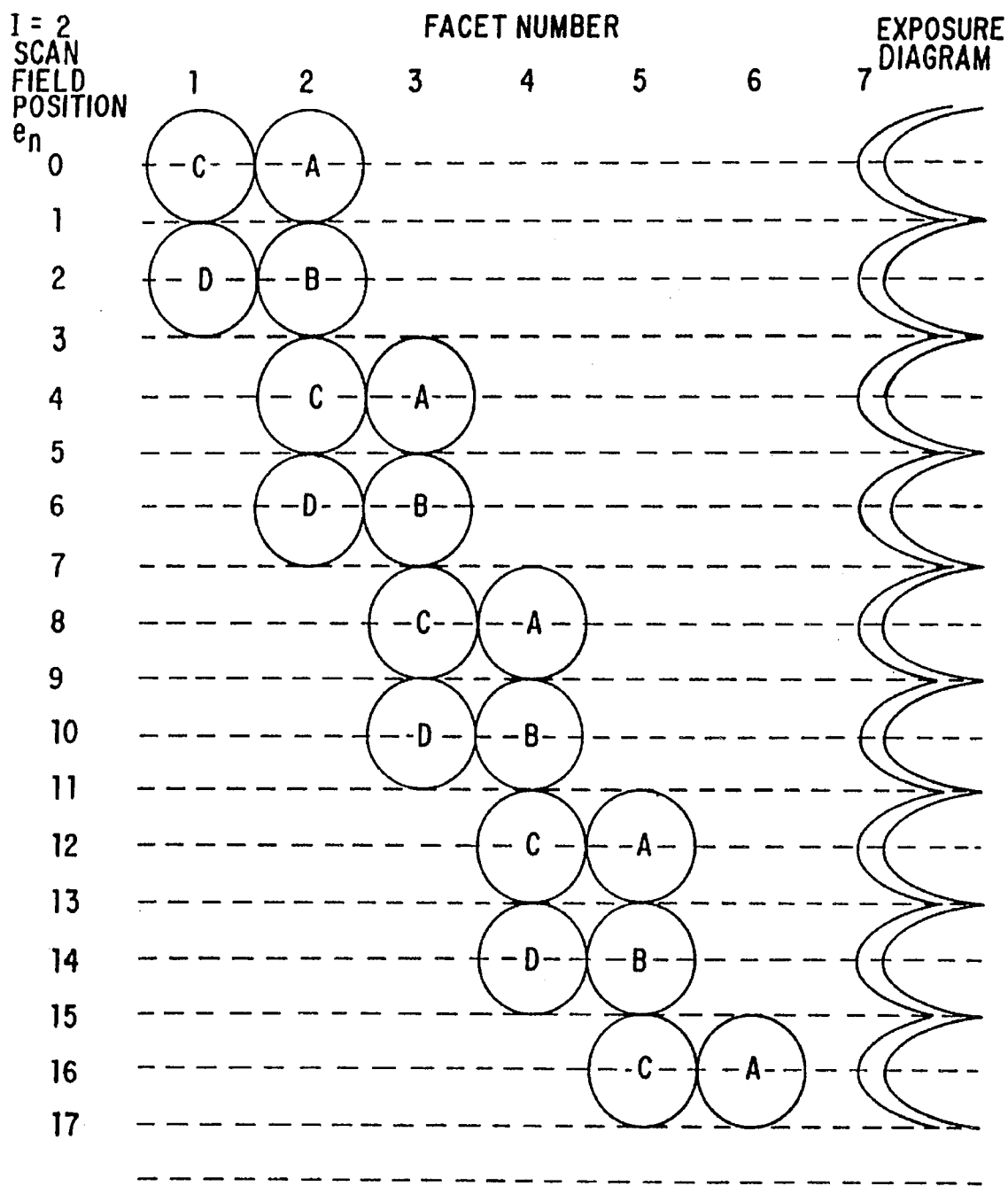
FIG. 4 is a diagram showing scan spacing wherein I=2 and Q=4.
Figure 5:
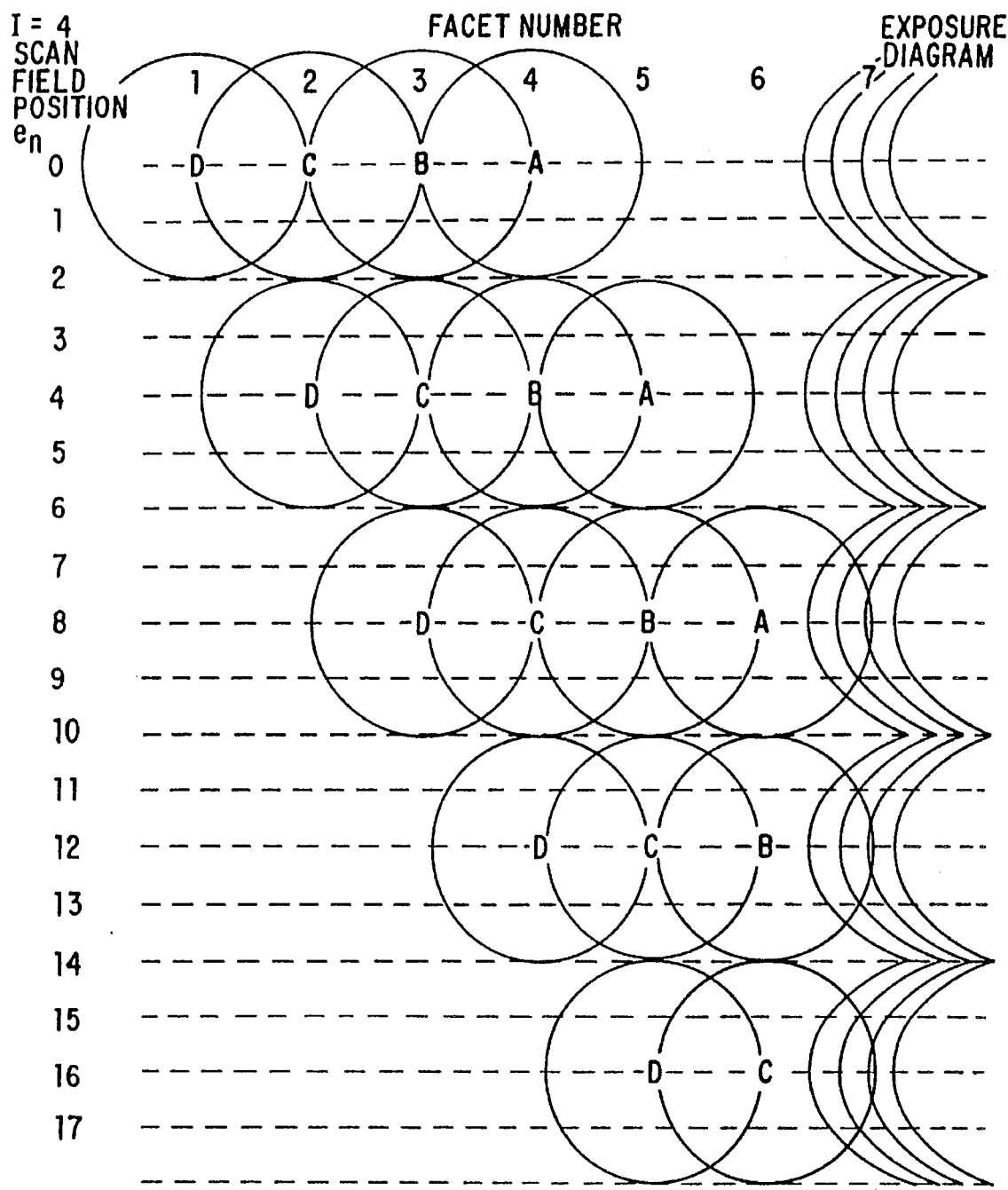
FIG. 5 is a diagram showing scan spacing where I=4 and Q=4.

FIGS. 4 and 5 illustrate multiple overlapped scanning. In this situation, I is a positive integer and has a common integer divisor greater than 1 with Q, the number of sources. Subsequent beams are laid down on top of those laid down during previous scans. Where I and Q have a common divisor equal to 2, double scanning will occur, as can be seen in FIG. 4. Where I and Q, the number of sources have an integer divisor equal to 4, quadruple scanning will occur, as can be seen in FIG. 5. Thus, the common divisor dictates the multiple of scans that will occur. Again, in both these instances, the spot size can be increased to produce a uniform image. This is illustrated in FIGS. 2, 5 and 6 by varied sizes of the circles A, B, C and D.

Figure 6:
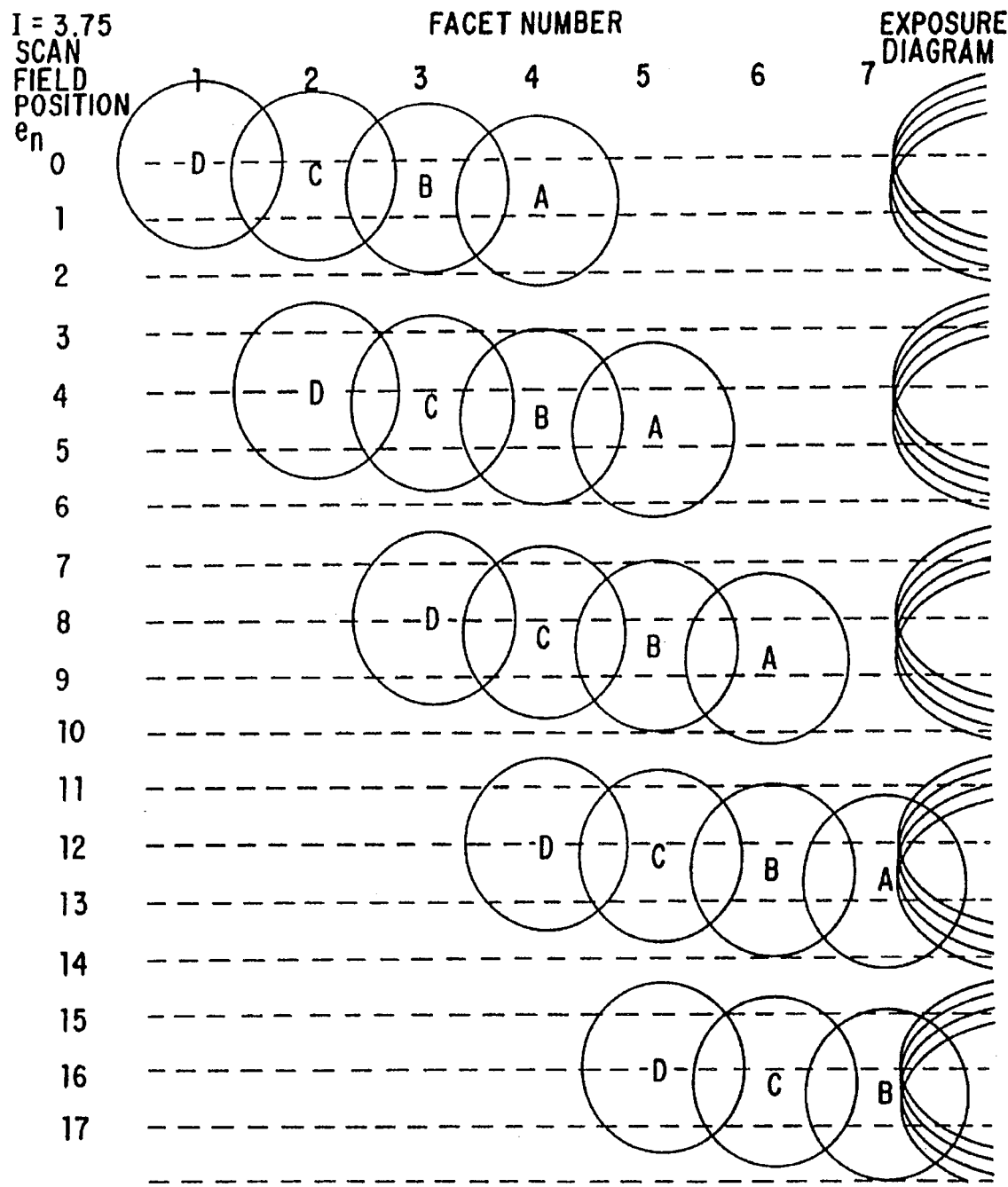
FIG. 6 is a diagram showing scan spacing where I=3.75 and Q=4.

FIG. 6 illustrates fractional interlace scanning where I=3.75 and the number of sources Q equals 4. This fractional interlace scanning produces overlapped scans. The spot size has been increased as can be seen by the larger circles A, B, C and D. By varying the spot size, a uniform image may be obtained. In the case of fractional scanning, the interlace factor again is equal to the distance between adjacent scans laid down on the photoreceptor during a single facet, measured in reference scans. For example, during facet 4, the interlace factor can be seen as the distance between circles A and B, as measured in reference scans.

FIG. 7 shows an example where five sources (i.e., Q=5) are used, and the process velocity, polygon velocity and beam spacing have been adjusted to obtain an interlace factor of three (i.e., I=3). Note that both I and Q have no common denominators, resulting in equally spaced, non-overlapped, interlaced scanning. For five sources, I=1, 2, 3, 4 or any other non-multiple of five will also provide equally spaced, non-overlapped, interlaced scanning. If three sources are used, for example, as in FIG. 8, equally spaced, non-overlapped, interlaced scanning would result if I were set to any integer not divisible by three (e.g., I=1, 2, 4 or 5).

Figures 9, 10:
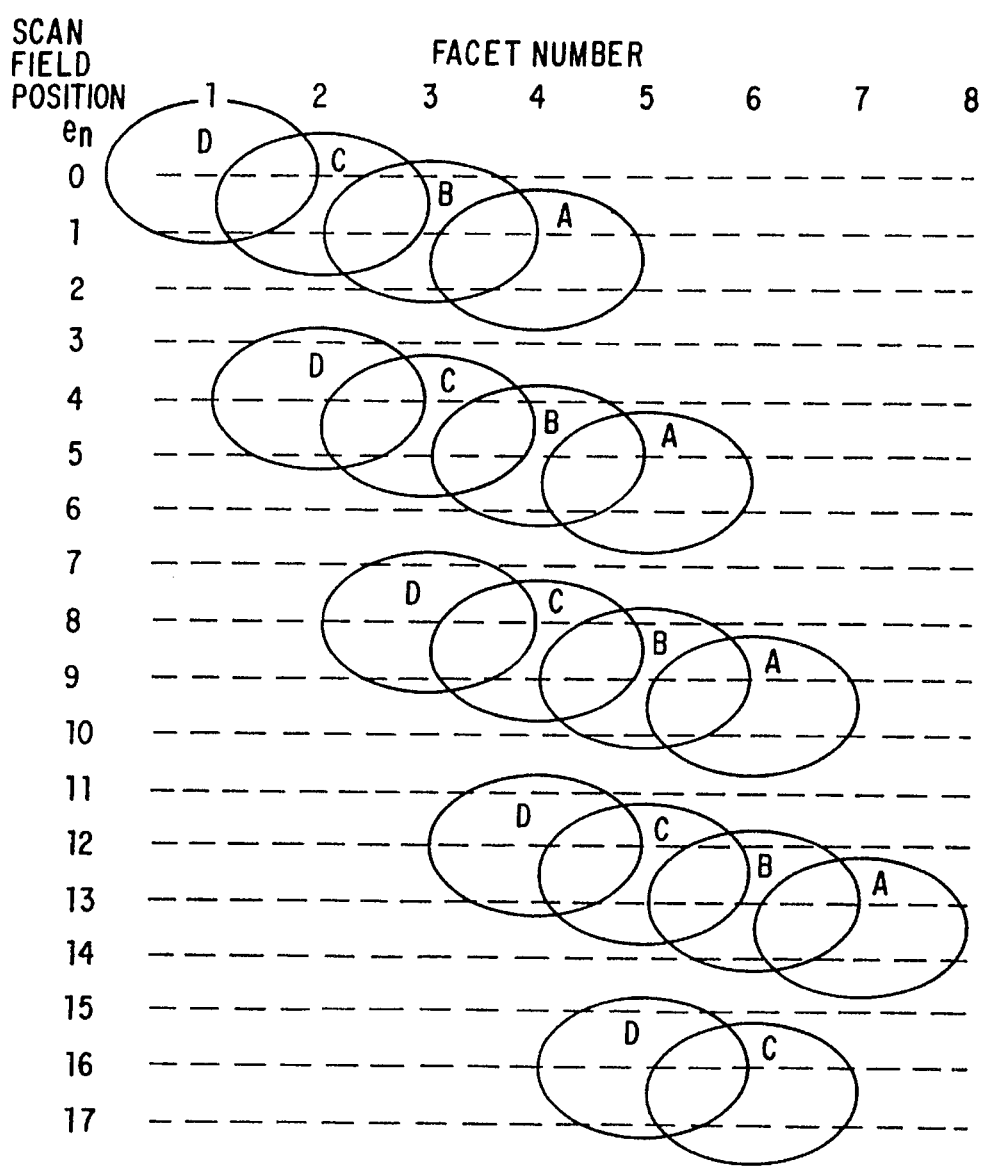
FIG. 9 is a table of values as derived for an interlace factor I=3.5.
FIG. 10 is a diagram showing scan spacing where I=3.5 and Q=4.
Figure 12:
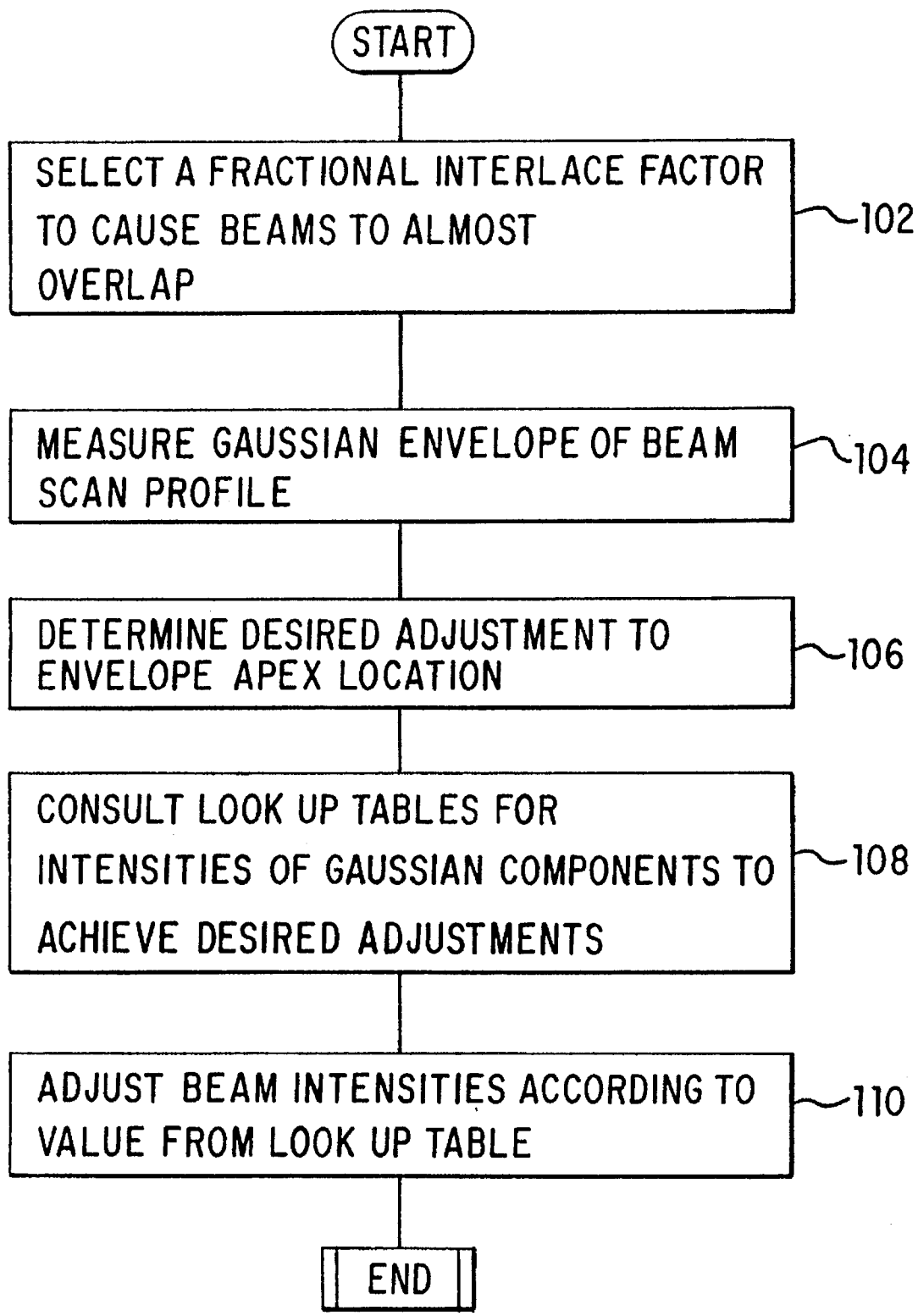
FIG. 12 is a flowchart of a method for carrying out the invention.

A preferred method for correcting system error resulting in gaps between interlaced beam scans in the fast scan line will be discussed with general reference to FIG. 12. A fractional interlace factor is selected which causes the axis of beams scanned to almost overlap (FIG. 12, step 102). Selection of the interlace factor I is made for a multibeam scan system, an example of which is shown in FIG. 1. I is first selected to be a multiple of the number of beams Q. For example, given four sources Q=4, for quadruple scanning, I is selected to equal a power of 4 so that m, the largest common factor of both Q and I, is also 4. I is then adjusted off the value of 4 to 3.5. Fractional interlace scanning is shown in FIGS. 6 and 10. The beam spot exposure location within the scan field is defined according to the following equation:

$$e_n = \mathrm{mod}I(n \cdot Q) \quad (2)$$

where $e_n$ is the exposure location in the scan field, n is an integer ranging between $0 \leq n < 1$; Q is the number of sources; and I is the interlace factor. FIG. 9 is a table disclosing values for n, n·Q and $e_n$ as provided by equation 2. A graphical representation of the data in FIG. 9 is shown in FIG. 10.

FIG. 10 depicts a scan field position vs. facet number chart for four sources (Q=4) with interlace factor of 3.5 (I=3.5). The scan field position ($e_n$) is indicative of the location of the center point of a beam spot. For example, as shown in FIG. 10, the first field scan position (FIG. 9, $e_n$=0) is graphically indicated by circle 'D' of facet 1. The second field scan position (FIG. 9, $e_n$=0.5) is indicated by spot 'C' of facet 2. The third and fourth field scan positions (FIG. 9, $e_n$=1.0 and 1.5 respectively) are indicated by spots 'B' of and 'A' of facets 3 and 4 respectively. The facet number refers to the facet of the polygon from which the beams were reflected. The interlace factor is measured from between the scan field position of any two beam spots from one facet divided by the distance between adjacent, interlaced scan.

Figure 11:
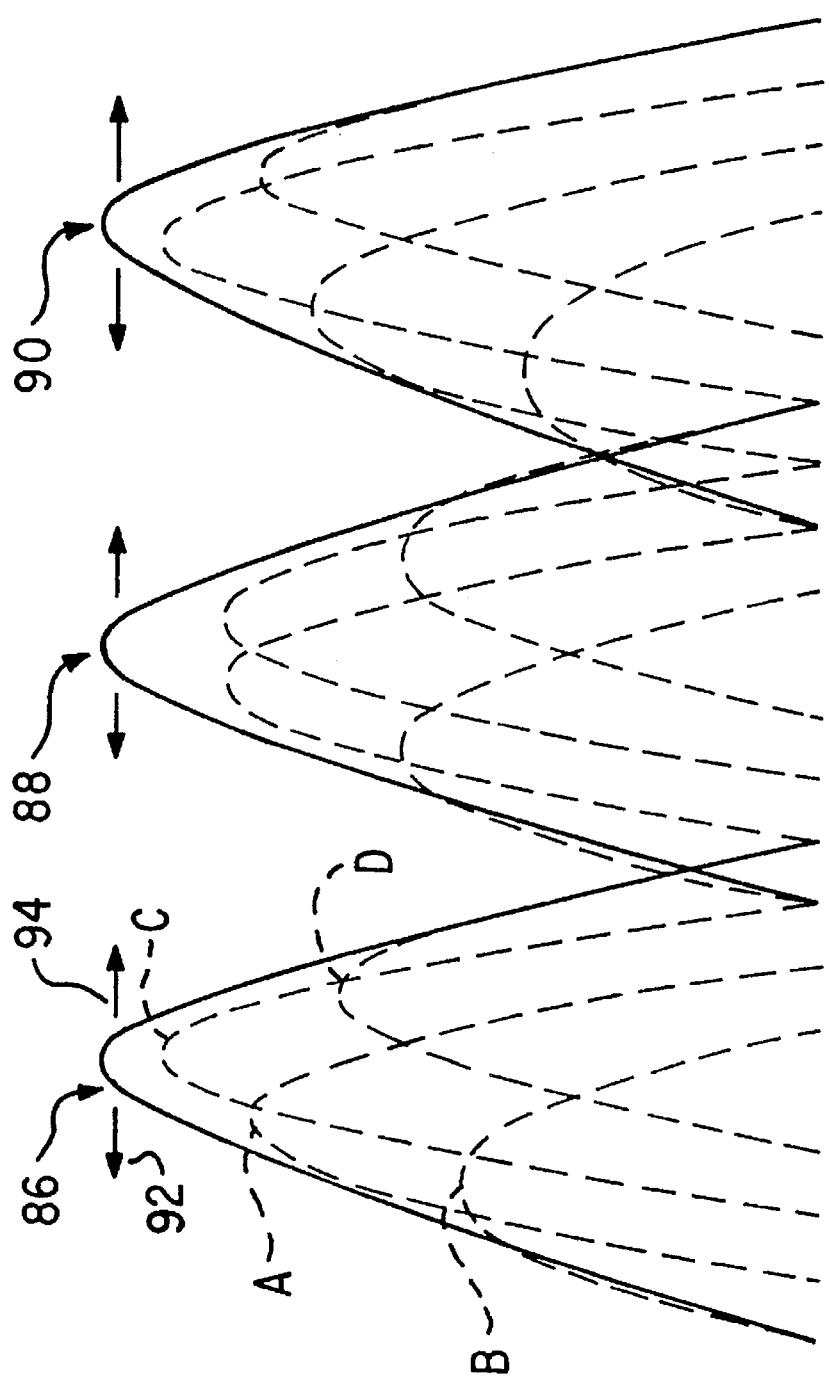
FIG. 11 is a graphical representation of the gaussian components of scanned beams.

Once an exposure profile is obtained, its intensity profile or Gaussian envelope is determined (FIG. 12, step 104). This determination is performed by means known to those of ordinary skill. A Gaussian envelope is composed of Gaussian curves of the envelopes' beam source components. For Q=4, the envelope (86, 88 and 90, FIG. 11) is composed of four independent sources from four consecutive scans as shown by A, B, C and D of FIG. 11 and the overlapping spots D, C, B, A of FIG. 10 wherein the envelope is measured from the apex of spot D to the bottom of spot A. By adjusting the intensities of the four component beam sources the envelope profile can be adjusted. The peak or apex of the envelope may be moved to the left (92, FIG. 11) or right (94, FIG. 11) by a small amount without destroying the integrity of the envelope. Movement of the envelope apex provides compensation for gaps in the scan line resulting from mechanical and optical systems caused aberrations and imperfections in the spot profile.

The desired adjustment to the envelope is determined so as to compensate for error in spot profile, beam position and system caused aberrations (FIG. 12, step 106).

Spot profile errors may arise from several sources such as the shape of the source aperture or optical system imperfections. In addition, the spot profile may be adjusted so that the combined shape of spot envelope in the slow scan direction produces a better filter response than possible with the gaussian shape of a single spot (for example, so that its fourier transform produces a steeper cutoff). Beam position errors may result from optical system imperfections, such as a bow in the scan, or non uniform process direction velocity. All of these errors may be calculated with simulation software in advance, or, as in the case of non-uniform process direction velocity, measured and compensated for during printing.

Scan line bow may arise from a sagital scan field which does not intersect the optical system exactly on the sagital axis plane. As the beam progresses in the fast scan direction, its position in the slow scan direction moves slowly so as to produce a slight arc instead of a straight line. These small perturbations in the scanning performance are predictable with simulation software, as the effects are ultimately caused by engineering tradeoffs in using less expensive optical system elements. As such, they can be predicted accurately in advance, and quantative correction values can be output and used to determine the desired beam location adjustments.

The fast scan direction refers to the lateral direction of the beams as positioned by the rotating polygon onto the photoreceptive recording medium 30. The slow scan direction refers to the photoreceptive recording medium rotation 62 about axis 60.

Once desired adjustment to beam location is determined, look up tables are consulted (FIG. 12, step 108). Look up tables provide data relating beam adjustments to beam intensity voltages and associated pulse rates for multibeam scanned spectrums. If the desired adjustment is known, the look-up table can be consulted to determine the beam intensity and/or pulse rate that will achieve the desired adjustment. An example of a look up table is provided in FIG. 13, which discloses the lookup table values used for driving four beams during a scan, in which the laser drive power is adjusted in a piecewise linear fashion over a fast scan field which has been arbitrarily divided into 21 positions.

Beam intensity is adjusted according to values found in the look up table (FIG. 12, step 110). Beam intensity may be controlled through controller means (75, FIG. 1) known to one of ordinary skill. The look up table may be stored in a memory of the controller for easy and direct access when performing adjustments to envelope apex location. Through manual adjustment of the location of an envelope, errors in the fast scan profile are corrected.

The invention has been described with reference to the preferred embodiments thereof which are intended to be illustrative rather than limiting. Various changes and modifications may be made without departing from the spirit and scope of the invention as defined in the following claims.

What is claimed is:

1. A fractional interlace scanning method for scanning a scan line across an image receiving member, the scan line formed by separately scanning a plurality of light beams across the image receiving member, the method comprising the steps of:

determining a shape of an envelope representative of a profile of the plurality of light beams to be separately scanned to form the scan line;

adjusting the shape of the envelope by changing a characteristic of one of the plurality of light beams; and separately scanning the plurality of light beams corresponding to the adjusted shape of the envelope to form the scan line.

2. The fractional interlace scanning method of claim 1, wherein the determining step comprises the steps of:

determining a Gaussian representation for each of the plurality of light beams; and adding the Gaussian representation for each of the light beams to determine the shape of the envelope.

3. The fractional interlace scanning method of claim 1, wherein the determining step comprises the step of combining a Gaussian representation for each of the plurality of light beams to determine the shape of the envelope.

4. The fractional interlace scanning method of claim 1, wherein the characteristic changing step comprises the step of changing an intensity of said one of the plurality of light beams.

5. The fractional interlace scanning method of claim 1, wherein the separately scanning step comprises separately scanning each of the plurality of light beams across the image receiving member using a rotating multifaceted mirror.

6. The fractional interlace scanning method of claim 5, wherein the separately scanning step further comprises separately scanning each of the light beams using a different facet of the rotating multifaceted polygon mirror.

7. The fractional interlace scanning method of claim 1, wherein the scan line is formed by separately scanning four light beams across the image receiving member.

8. The fractional interlace scanning method of claim 1, wherein said separately scanning step comprises the steps of:

scanning a first one of said light beams across said image receiving member in a fast scan direction to form a first scan pattern; and scanning a second one of said light beams across said image receiving member in a fast scan direction to form a second scan pattern, the second scan pattern overlapping with the first scan pattern.

9. The fractional interlace scanning method of claim 8, wherein the first one of said light beams is scanned using a first facet of a rotating multifaceted mirror.

10. The fractional interlace scanning method of claim 9, wherein the second one of said light beams is scanned using a second facet of the rotating multifaceted mirror.

11. The fractional interlace scanning method of claim 8, wherein the separately scanning step further comprises the step of:

scanning a third one of said light beams across said image receiving member in a fast scan direction to form a third scan pattern, the third scan line overlapping with the second scan pattern.

12. The fractional interlace scanning method of claim 11, wherein the first one of said light beams is scanned using a first facet of a rotating multifaceted mirror, the second one of said light beams is scanned using a second facet of the rotating multifaceted mirror, and the third one of said light beam is scanned using a third facet of the rotating multifaceted mirror.

13. The fractional interlace scanning method of claim 11, wherein the separately scanning step further comprises the step of:

scanning a fourth one of said light beams across said image receiving member in a fast scan direction to form a fourth scan pattern, the fourth scan pattern overlapping with the third scan pattern.

14. The fractional interlace scanning method of claim 13, wherein the first one of said light beams is scanned using a first facet of a rotating multifaceted mirror, the second one of said light beams is scanned using a second facet of the rotating multifaceted mirror, the third one of said light beam is scanned using a third facet of the rotating multifaceted mirror, and the fourth one of said light beams is scanned using a fourth facet of the rotating multifaceted mirror.

15. The fractional interlace scanning method of claim 14, wherein the scan line comprises the first scan pattern, the second scan pattern, the third scan pattern, and the fourth scan pattern.

16. The fractional interlace scanning method of claim 1, wherein the adjusting step comprises adjusting the shape of the envelope to a desired shape of the envelope.

17. The fractional interlace scanning method of claim 1, wherein the image receiving member is a photoreceptor.

18. The fractional interlace scanning method of claim 1, wherein the separately scanning step comprises separately emitting the plurality of light beams with characteristics corresponding to the adjusted shape of the envelope.

19. A fractional interlace scanning method for adjusting a profile of a scan image, each scan image formed by scanning a plurality of light beams across an image receiving member with a multifaceted polygon mirror, the profile adjusted in a direction parallel to a process direction of the image receiving member, the method comprising the steps of:

determining a shape of an envelope representative of a profile of the plurality of light beams to be scanned to form the scan image, the shape of said envelope showing a simulated profile of said scan image in the process direction;

adjusting a characteristic of one of said light beams to change the shape of the envelope, the changed shape of the envelope showing a new profile of said scan image in the process section; and separately scanning, using different facts of said multifaceted polygon mirror, said adjusted one of said light beams and remaining ones of said plurality of light beams across the image receiving member to form the scan image, the scan image having the new profile in the process direction.

20. A fractional interlace scanning method for forming a scan line on an image receiving member, the scan line formed by separately scanning a plurality of light beams across the image receiving member, the method comprising the steps of:

determining a shape of a profile of an envelope representative of the plurality of light beams to be separately scanned across the image receiving member to form the scan line;

adjusting a characteristic of one of the light beams to be separately scanned across the image receiving member to form the scan line, the adjusted characteristic of said one of the plurality of light beams changing the shape of said envelope; and scanning the plurality of light beams corresponding to the changed shape of the envelope to form the scan line.

21. A fractional interlace scanning apparatus for forming a scan image across an image receiving member, the scan line formed by separately scanning a plurality of light beams across the image receiving member, the apparatus comprising:

a determining device that determines a shape of an envelope representative of a profile of the plurality of light beams to be separately scanned to form the scan line;

an adjusting device that adjusts the shape of the envelope by changing at least one characteristic of the light beams to be scanned;

a light emitting device that emits the plurality of light beams corresponding to the adjusted shape of the envelope; and a scanning device positioned in a path of the plurality of light beams between the light emitting device and the image receiving member, the scanning device separately scanning each of the plurality of light beams across the image receiving member.

22. The fractional interlace scanning apparatus of claim 21, wherein the image receiving member comprises a photoreceptor.

23. The fractional interlace scanning apparatus of claim 21, wherein the scanning device comprises a rotating multifaceted mirror.

24. The fractional interlace scanning apparatus of claim 21, wherein each of the plurality of light beams forming the scan line is scanned using a different facet of the rotating multifaceted mirror.

25. The fractional interlace scanning apparatus of claim 21, wherein the light emitting device comprises a controller that controls an intensity of the light beams corresponding to the adjusted shape of the envelope.

26. The fractional interlace scanning apparatus of claim 21, wherein the determining device combines a Gaussian representation for each of the plurality of light beams to determine the shape of the envelope.

27. The fractional interlace scanning apparatus of claim 21, wherein the adjusting device changes an intensity level of said at least one of the light beams to be scanned, the changed intensity level adjusting the shape of the envelope.

28. The fractional interlace scanning apparatus of claim 21, wherein the adjusting device includes a look-up table, stored in memory, for changing an intensity level of said at least one beam.

* * * * *